United States Patent
Koizumi et al.

(10) Patent No.: US 12,549,043 B2
(45) Date of Patent: Feb. 10, 2026

(54) ROTATING ELECTRIC MACHINE

(71) Applicant: Hitachi Astemo Electric Motor Systems, Ltd., Hitachinaka (JP)

(72) Inventors: Takayuki Koizumi, Hitachinaka (JP); Kiyoshi Ito, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 234 days.

(21) Appl. No.: 18/225,268

(22) Filed: Jul. 24, 2023

(65) Prior Publication Data

US 2024/0339872 A1 Oct. 10, 2024

(30) Foreign Application Priority Data

Apr. 10, 2023 (JP) .................. 2023-063123

(51) Int. Cl.
| | |
|---|---|
| *H02K 1/16* | (2006.01) |
| *H02K 1/14* | (2006.01) |
| *H02K 1/20* | (2006.01) |
| *H02K 3/24* | (2006.01) |

(52) U.S. Cl.
CPC .............. *H02K 1/16* (2013.01); *H02K 1/146* (2013.01); *H02K 1/20* (2013.01); *H02K 3/24* (2013.01)

(58) Field of Classification Search
CPC ........... H02K 1/146; H02K 1/16; H02K 1/20; H02K 3/24; H02K 9/19; H02K 9/197
USPC .......................................... 310/179
See application file for complete search history.

(56) References Cited

U.S. PATENT DOCUMENTS

| | | | | |
|---|---|---|---|---|
| 8,400,029 | B2* | 3/2013 | Sugimoto | B60L 15/20 |
| | | | | 310/58 |
| 10,840,761 | B2* | 11/2020 | Ishigami | H02K 15/021 |
| 10,886,805 | B2* | 1/2021 | Takahashi | H02K 1/146 |
| 11,309,760 | B2* | 4/2022 | Matsumoto | H02K 3/48 |
| 2011/0133580 | A1* | 6/2011 | Sugimoto | H02K 1/20 |
| | | | | 310/54 |
| 2014/0070639 | A1* | 3/2014 | Tamura | H02K 9/19 |
| | | | | 310/54 |
| 2018/0254673 | A1* | 9/2018 | Koizumi | H02K 3/48 |
| 2019/0280547 | A1* | 9/2019 | Takahashi | H02K 1/146 |
| 2020/0235627 | A1* | 7/2020 | Matsumoto | H02K 1/32 |
| 2020/0358329 | A1* | 11/2020 | Fukuda | H02K 3/345 |
| 2021/0249926 | A1* | 8/2021 | Enomoto | H02K 3/50 |
| 2021/0376671 | A1* | 12/2021 | Tsuchiya | H02K 15/064 |

FOREIGN PATENT DOCUMENTS

| | | |
|---|---|---|
| JP | 2001-45713 A | 2/2001 |
| WO | WO-2020116157 A1 * | 6/2020 |

* cited by examiner

*Primary Examiner* — Alex W Mok
(74) *Attorney, Agent, or Firm* — Crowell & Moring LLP

(57) ABSTRACT

The rotating electric machine comprises: a stator core that has a first stator core portion and a second stator core portion, and an air gap portion, the first and the second stator core portions having slots and being divided in the axial direction, the air gap portion being formed between the first stator core portion and the second stator core portion by making the first stator core portion and the second stator core portion face each other in the axial direction; a plurality of coil conductors inserted into the slots; a wall portion covering the air gap portion on the inner circumference side of the air gap portion; and a coolant flow passage that sends a coolant supplied from the outer circumference side of the stator core to the air gap portion through between the plurality of coil conductors to both end surfaces of the stator core.

5 Claims, 13 Drawing Sheets

ROTATING ELECTRIC MACHINE

CLAIM OF PRIORITY

The present application claims priority from Japanese Patent Application JP 2023-063123 filed on Apr. 10, 2023, the content of which is hereby incorporated by reference into this application.

BACKGROUND OF THE INVENTION

The present invention relates to a rotating electric machine, such as a motor and an electric generator.

Japanese Unexamined Patent Application Publication No. 2001-45713 describes a rotating electric machine in which a stator core that includes a stack body of stator iron plates is divided in the axial direction to obtain a plurality of divided stator cores, and when the divided stator cores are inserted into a cylindrical housing, the divided stator cores are fixed such that a gap is formed between the divided stator cores. In this rotating electric machine, the gap that is formed between the plurality of divided stator cores is as an intermediate duct portion (see Abstract). Cooling air that is admitted into this intermediate duct portion is passed through a slot teeth portion to be introduced into an air gap between a stator and a rotor, and is passed through here to cool the rotor (see paragraph 0049).

SUMMARY OF THE INVENTION

In the rotating electric machine of Japanese Unexamined Patent Application Publication No. 2001-45713, the cooling air is passed from the stacking thickness direction center portion of the stator core through the air gap between the stator and the rotor to cool the rotor. In the rotating electric machine, there are various applications, the stacking thickness tends to be increased in realizing higher torque and higher output, and the temperature increase in the stacking thickness direction center portion of the stator core is more significant. In addition, when the segment coil having a large cross-sectional area is used as the coil conductor, the eddy current loss of the conductor is also increased. To solve these problems, it is desirable that the coolant be made to flow not only to the stacking thickness center portion of the stator core, but also to near the coil conductor that is a heat generation portion, thereby increasing the cooling efficiency.

An object of the present invention is to provide a rotating electric machine capable of realizing smaller size and higher output by flowing a coolant to near a coil conductor that is a heat generation portion, thereby improving the cooling efficiency.

In order to achieve the above object, a rotating electric machine of this invention comprises: a stator core that has a first stator core portion and a second stator core portion, and an air gap portion, the first stator core portion and the second stator core portion having slots and being divided in the axial direction, the air gap portion being formed between the first stator core portion and the second stator core portion by making the first stator core portion and the second stator core portion face each other in the axial direction; a plurality of coil conductors that are inserted into the slots; a wall portion that covers the air gap portion on the inner circumference side of the air gap portion; and a coolant flow passage that sends a coolant supplied from the outer circumference side of the stator core to the air gap portion through between the plurality of coil conductors to both end surfaces of the stator core.

According to the present invention, it is possible to provide the rotating electric machine capable of realizing smaller size and higher output by making the coolant flow to near the coil conductor that is the heat generation portion, thereby improving the cooling efficiency.

Objects, configurations, and effects other than the above will be apparent from the description of the following embodiments.

DETAILED DESCRIPTION OF THE PREFERRED EMBODIMENTS

Figure 1:
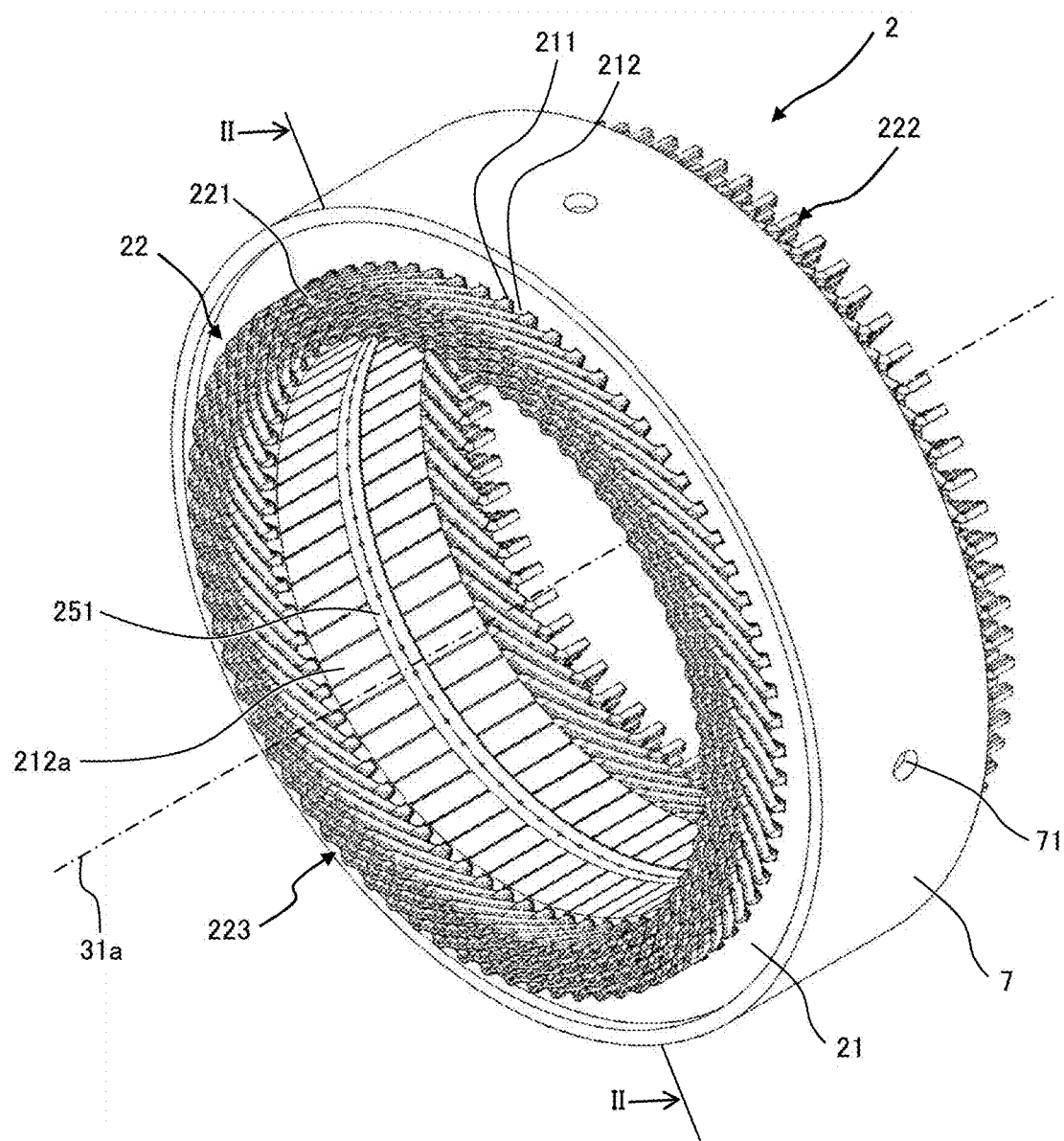
FIG. 1 is a perspective view of a stator according to a first example of the present invention.

Hereinafter, an embodiment for carrying out the present invention will be described with reference to the drawings. It should be noted that the shared configurations in the respective drawings are indicated by the same reference numerals, and the overlapped description thereof is omitted. In addition, when there are different portions for the configurations indicated by the same reference numerals, they will be described, as needed.

A rotating electric machine described in this embodiment is suitable as, for example, the running motor of an electric automobile. Hereinafter, the running motor of the electric automobile will be referred to as a rotating electric machine for vehicle driving for description when it is particularly required to be distinguished from other rotating electric machines. Here, examples of the electric automobile include a pure electric automobile that runs by only the rotating electric machine and a hybrid type electric automobile that runs by both of an engine and the rotating electric machine.

The rotating electric machine for vehicle driving tends to be made smaller by increasing the current density of the coil conductor, and also tends to be increased in stacking thickness in realizing higher torque and higher output in accordance with the vehicle size, so that the temperature increase in the stacking thickness center portion of the stator core is more significant. On the other hand, the rotating electric machine for vehicle driving is adopting the stator that uses the segment coil having a large cross-sectional area as the coil conductor, thereby improving the conductor space factor in the slot of the stator core, and aiming at smaller size and higher output. In such the stator, since the cross-sectional area of the coil conductor is large, the eddy current loss of the conductor also tends to be increased, and in addition, since various operation patterns are considered in accordance with the vehicle operation, the operation pattern in which the iron loss of the stator core becomes large is also considered. To solve these problems, the coolant is required to be made to flow not only to the stacking thickness center portion of the stator core but also to the coil conductor that is the heat generation portion and the portion closer to the conductor slot portion of the stator core.

Figure 11:
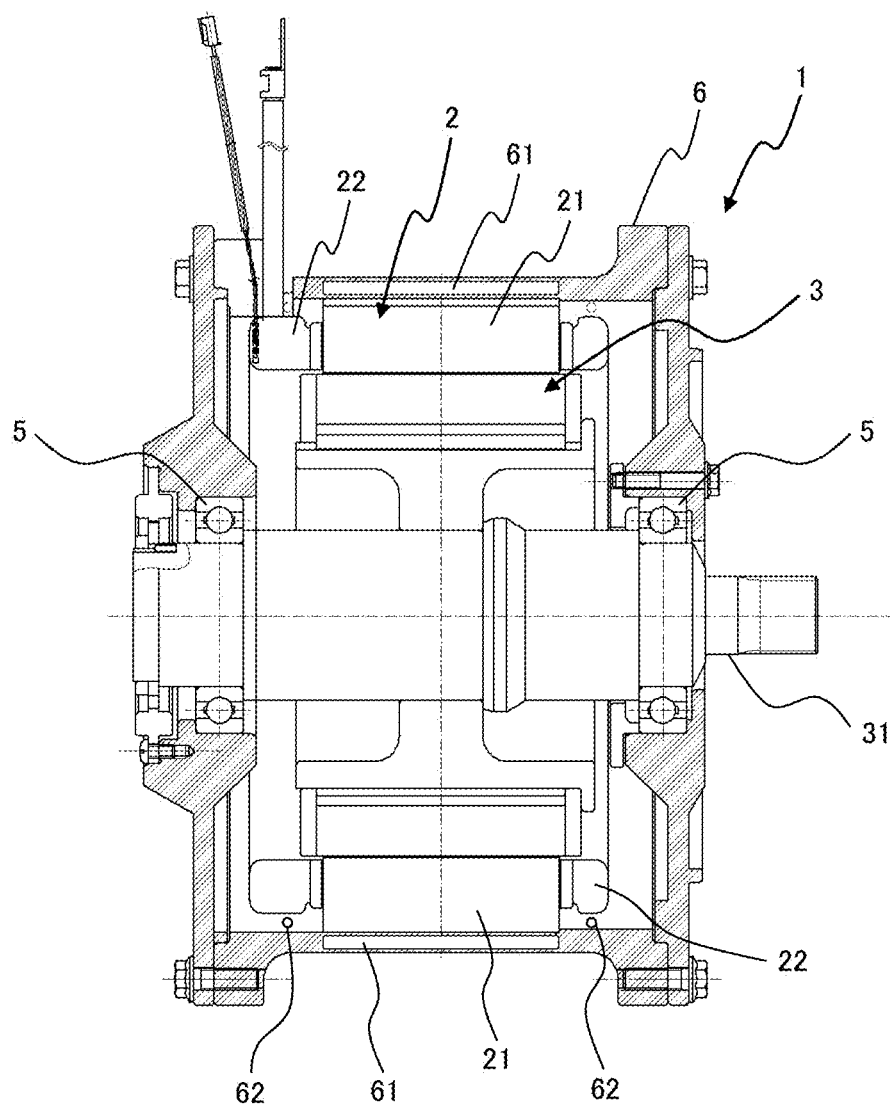
FIG. 11 is a cross-sectional view of a rotating electric machine according to an example in comparison with the present invention.

The configuration of a rotating electric machine 1 in accordance with an example in comparison with the present invention will be described with reference to FIG. 11. FIG. 11 is a cross-sectional view of the rotating electric machine 1 in accordance with the example in comparison with the present invention.

The rotating electric machine 1 includes a rotor 3 that is configured on a rotation shaft 31 axially supported by a bearing 5, and a stator 2 that is disposed through a very small gap relative to the outer circumference of the rotor 3, and the stator 2 includes a stator core 21 that has a plurality of slots 211 (see FIG. 12) formed in the circumferential direction, and a stator winding 22 including the coil conductors. In addition, a water jacket 61 that makes the coolant flow is formed in a housing 6, and an oil pipe 62 that injects oil to the coil end portion of the stator winding 22 is provided in the interior of the housing 6. The water jacket 61 and the oil pipe 62 are provided to cool the rotating electric machine 1.

Figure 12:
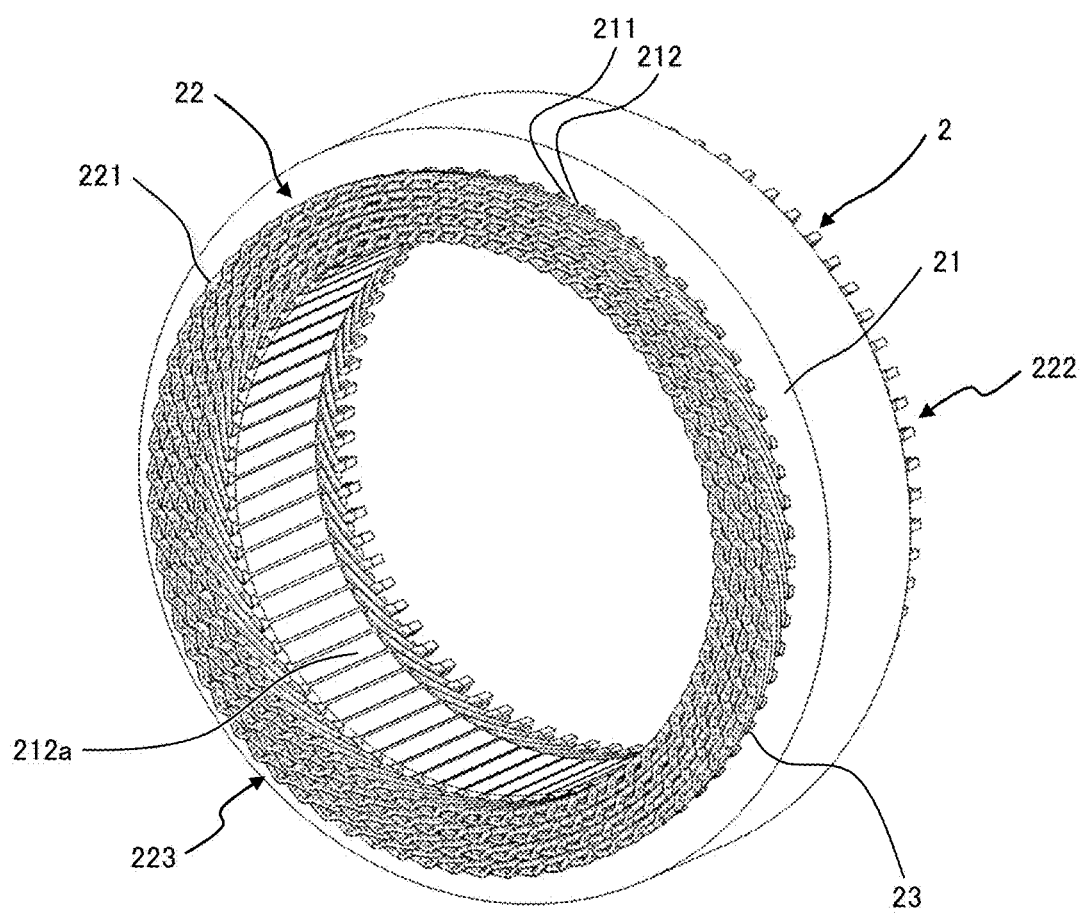
FIG. 12 is a perspective view of the stator according to the example in comparison with the present invention.

The stator 2 using a segment coil 221 will be described with reference to FIG. 12. FIG. 12 is a perspective view of the stator 2 in accordance with the example in comparison with the present invention.

The stator winding 22 is configured to the stator core 21 by using a plurality of segment coils 221 in substantially U-shape. The segment coils 221 are inserted into the plurality of slots 211, and the stator winding 22 in a form of wave winding is formed to a plurality of teeth 212. The plurality of teeth 212 are formed so as to be protruded from the outer circumference side of the stator core 21 toward the inner circumference side of the stator core 21, and the slots 211 are formed between the adjacent teeth 212. End portions 212a of the teeth 212 are opposite to the outer circumference surface of the rotor 3 through predetermined gaps.

A connection side coil end 222 that connects the terminal portions of the segment coils 221 and a non-connection side coil end 223 formed by the portions that become the apexes of the U-shapes of the segment coils 221 (the fold-back portions) are formed on both end surfaces of the stator core 21. The segment coils 221 are insulated from the stator core 21 by insulation paper 23.

Figure 13:
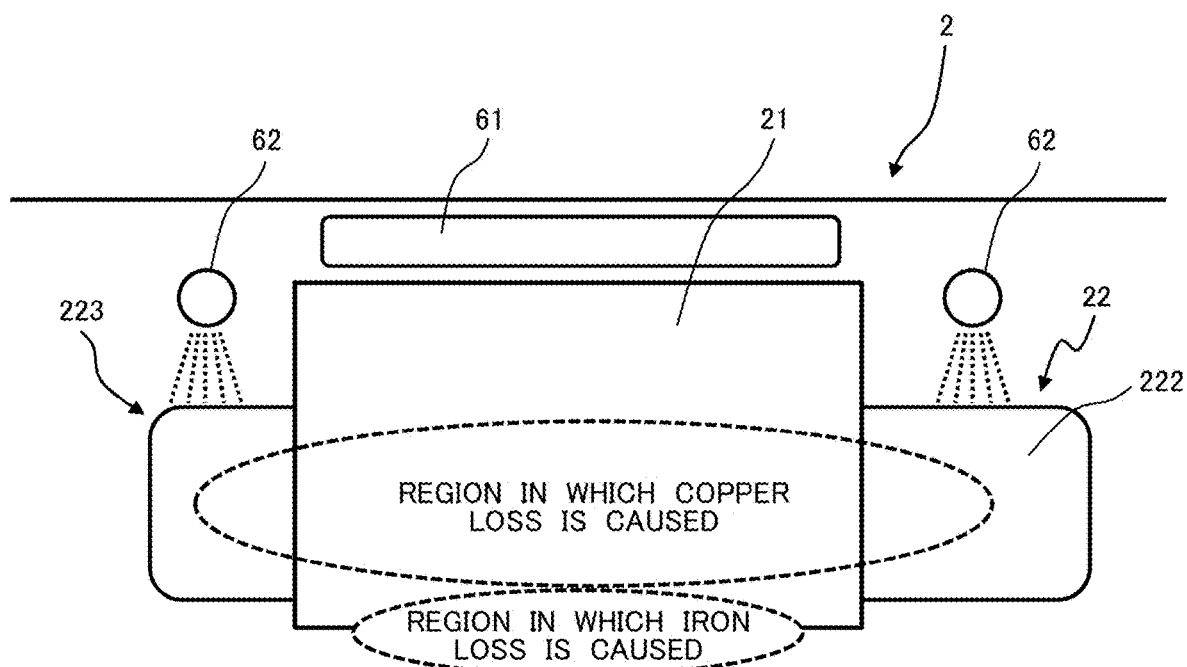
FIG. 13 is a schematic diagram illustrating the heat generation portion and the cooling portion of the stator of the comparative example.

The heat generation portion of the stator 2 will be described with reference to FIG. 13. FIG. 13 is a schematic diagram illustrating the heat generation portion and the cooling portion of the stator 2 of the comparative example.

The heat generation of the stator 2 has the same meaning as the loss of the rotating electric machine 1, and is mainly classified into copper loss that is caused in the coil conductor configuring the segment coil 221 and iron loss that is caused in the teeth 212 of the stator core 21. In addition, by using the segment coil 221 having a large cross-sectional area as the coil conductor, the conductor space factor of the slot 211 of the stator core 21 is improved, and in the segment coil type stator that aims at smaller size and higher output, the eddy current loss of the coil conductor also tends to be increased since the cross-sectional area of the coil conductor is large.

A cooling unit is provided with respect to the heat generation portion of the stator 2. In FIGS. 11 and 13, the cooling unit is configured of the water jacket 61 and the oil pipe 62. The portion cooled by the water jacket 61 is separated from the heat generation portion of the stator 2. The cooling by the coolant of the water jacket 61 is the cooling by heat conduction from the outer circumference surface of the stator core 21. The cooling by the oil pipe 62 is performed by injecting the oil from the oil pipe 62 to each of the coil end portions 222, and 223. In this case, the cooling by the oil pipe 62 is performed by directly injecting the coolant to the coil conductor that is the heat generation portion. However, the portion of the coil conductor that is located at the stacking thickness direction center portion of the stator core 21 has the highest temperature in the coil conductor, and this portion is cooled by heat transmission. Hereinafter, this will be described in detail.

Since there is also the cooling by natural convection on the surface of the stator 2, the portion of the coil conductor accommodated in the slot 211, which is located at the stacking thickness direction center portion of the stator core 21 is likely to have the highest temperature in the stator 2, thereby requiring a design such that the temperature of this portion is equal to or below the heat-resistant temperature of the material used in the stator 2.

When the cooling efficiency can be increased, the design by the higher current density is enabled, so that the smaller size and the higher output of the rotating electric machine 1 are enabled. In this way, it is important in the design to cool the heat generation portion more efficiently, and it is necessary to make the coolant flow to the portion closer to the heat generation portion.

The cooling configuration of the stator 2 will be described with reference to FIGS. 1 to 10. The configuration of the rotating electric machine 1 described in FIGS. 11 to 13 is configured in common also in the rotating electric machine 1 of the present invention except for the cooling configuration that is configured of the water jacket 61 and the oil pipe 62 and the insulation configuration using the insulation paper 23.

Figure 2:
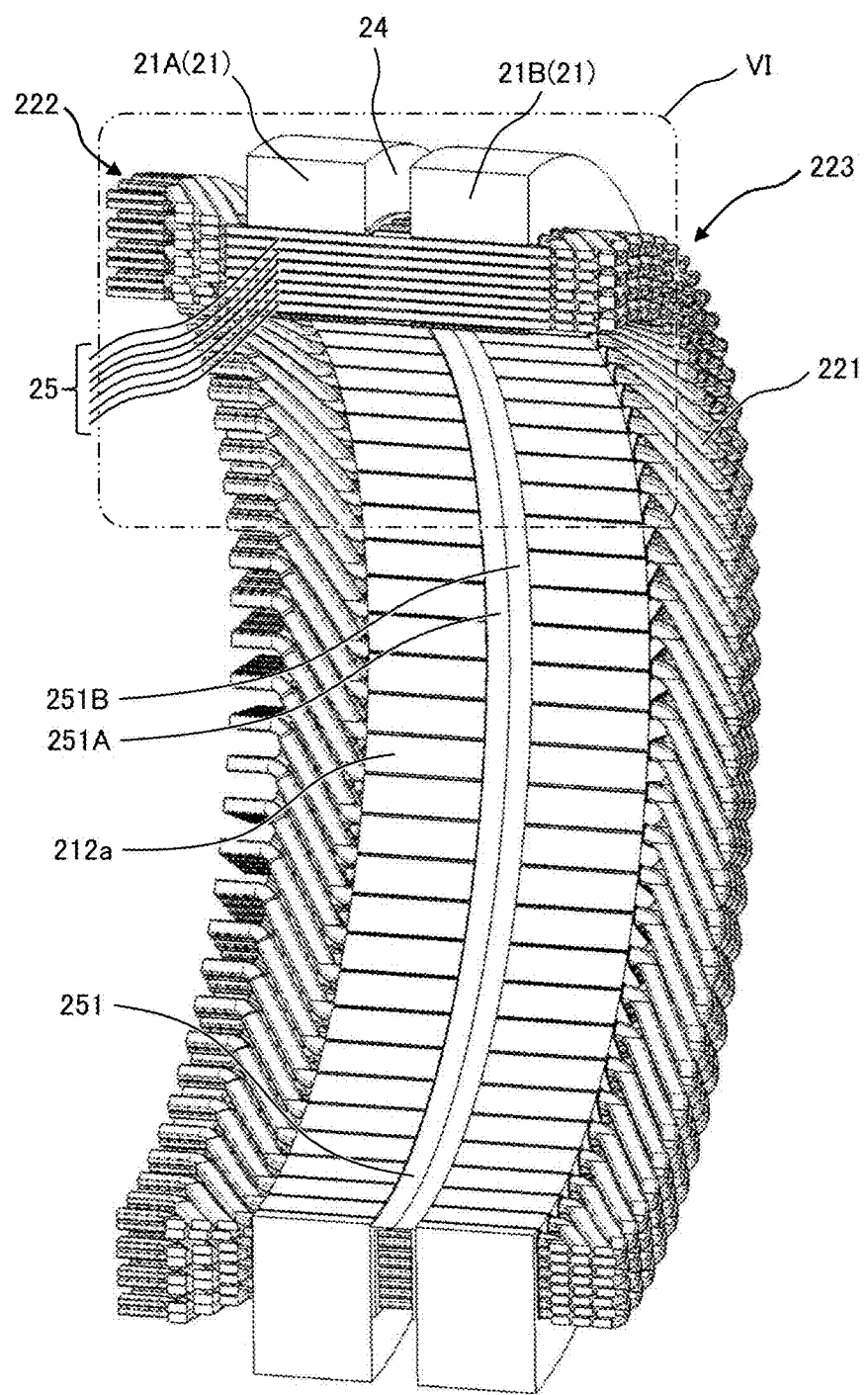
FIG. 2 is a perspective view illustrating a cross portion taken along line II-II of the stator of FIG. 1.

First, the configuration of the stator 2 of the present example will be described with reference to FIGS. 1 and 2. FIG. 1 is a perspective view of the stator 2 according to a first example of the present invention. FIG. 2 is a perspective view illustrating a cross portion taken along line II-II of the stator of FIG. 1. It should be noted that in FIG. 2, the illustration of a housing 7 is omitted.

The stator winding 22 is formed by using the plurality of segment coils 221 in substantially U-shape. The segment coils 221 are inserted into the slots 211 to form the stator winding 22 in a form of wave winding. The connection side coil end 222 that connects the terminal portions of the segment coils 221 and the non-connection side coil end 223 formed by the portions that become the apexes of the U-shapes of the segment coils 221 are formed on both end surfaces of the stator core 21.

The stator core 21 is fixed to the housing 7 by shrink fit or press fit. The stator core 21 is formed by stacking thin plates (thin electromagnetic steel plates). The direction in which the electromagnetic steel plates are stacked is called the stacking thickness direction. The stacking thickness direction coincides with the direction along a center line 31a of the rotation shaft 31 of the rotor 3. The center line 31a of the rotation shaft 31 coincides with the center line of the stator core 21. The direction along the center line 31a may be called the axial direction for description.

Figure 3:
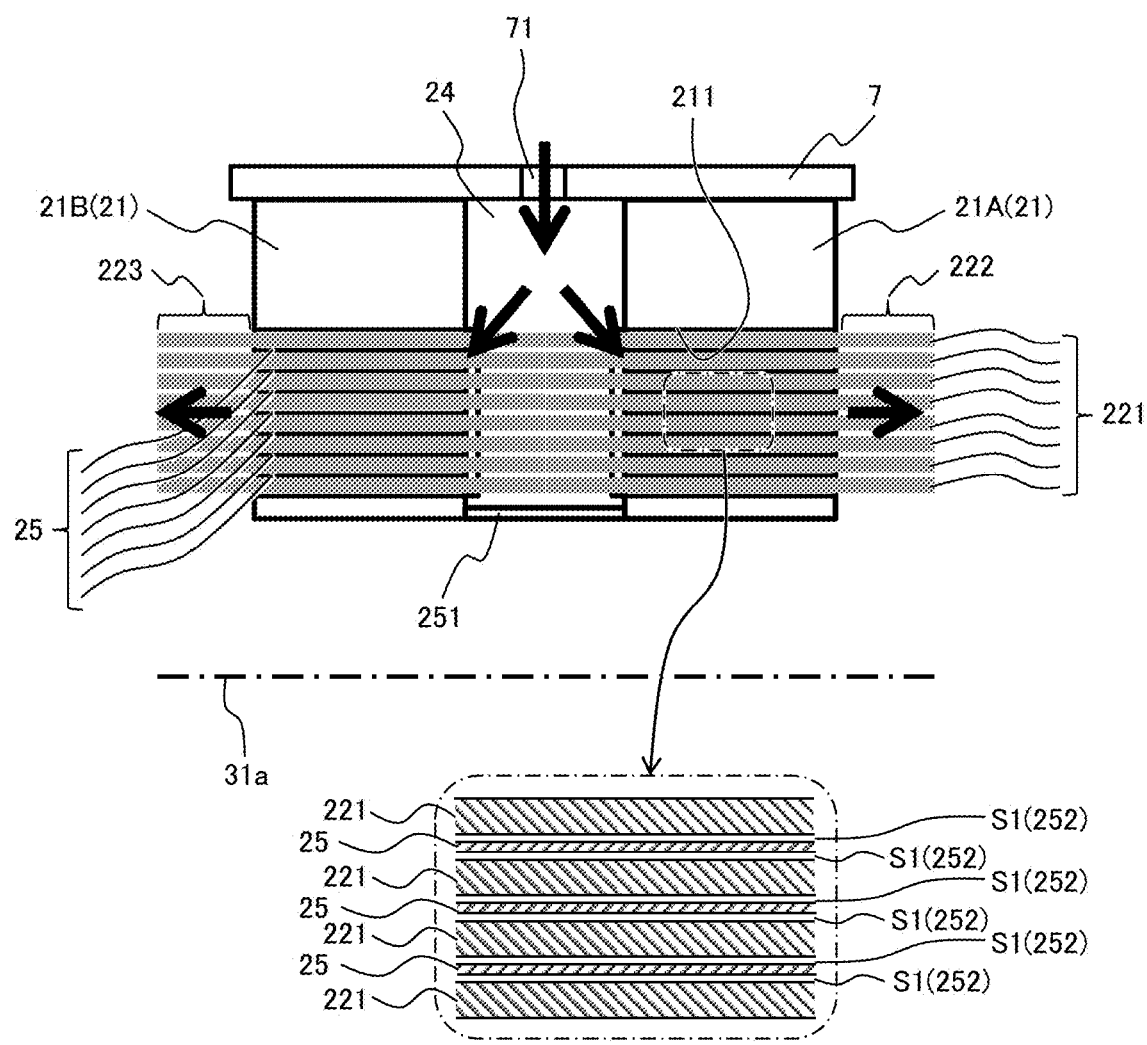
FIG. 3 is a cross-sectional view schematically illustrating a cross section along the axial direction of a stator core of FIG. 1.
Figure 4:
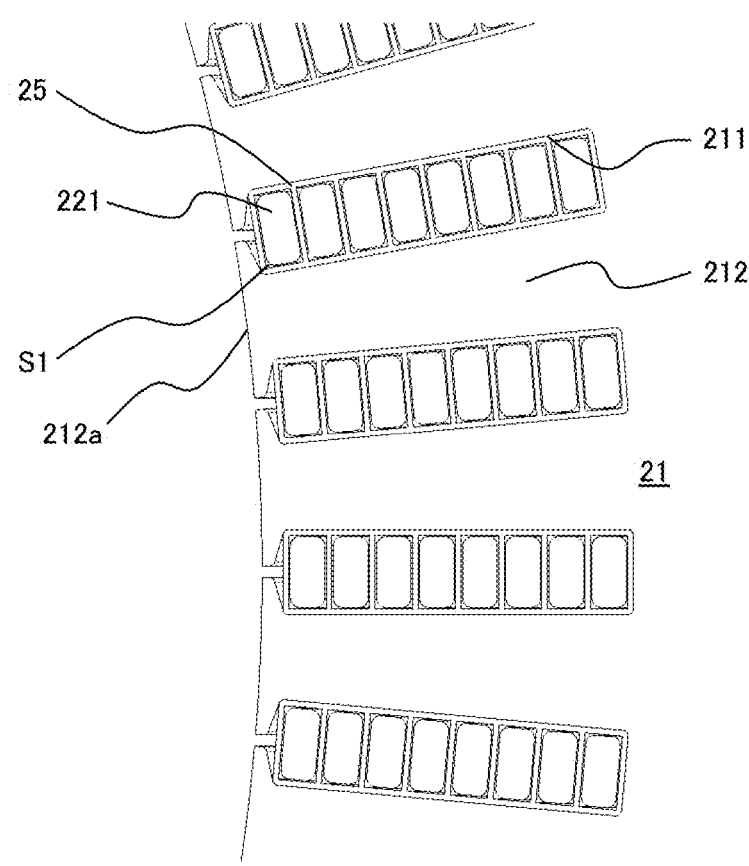
FIG. 4 is a partial cross-sectional view perpendicular to the axial direction of the stator core of FIG. 1.
Figure 5:
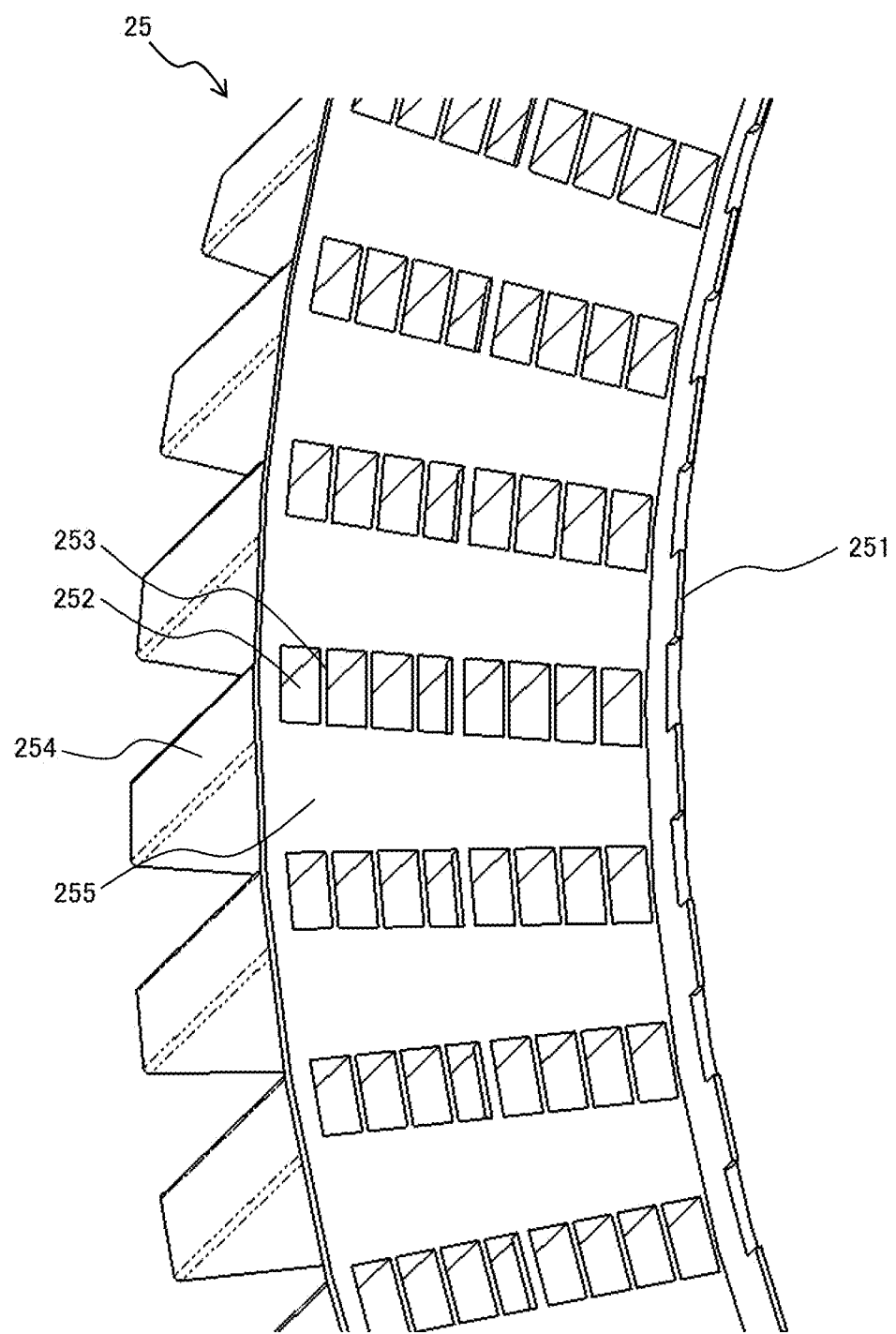
FIG. 5 is a perspective view illustrating part of a partition.

The stator core 21 will be described with reference to FIGS. 3 to 5. FIG. 3 is a cross-sectional view schematically illustrating a cross-section along the axial direction of the stator core 21 of FIG. 1. FIG. 4 is a partial cross-sectional view perpendicular to the axial direction of the stator core 21 of FIG. 1. FIG. 5 is a perspective view illustrating part of a partition 25.

As illustrated in FIG. 3, the stator core 21 is divided into two in the stacking thickness direction (the axial direction) of the stator core 21, and includes a first stator core portion 21A that configures one end surface of the stator core 21, and a second stator core portion 21B that configures the other end surface of the stator core 21. An air gap portion 24 in the axial direction is formed between the first stator core portion 21A and the second stator core portion 21B. The air gap portion 24 is closed by the ring-shaped housing 7 in which the outer circumference side thereof is assembled to the outer circumference portion of the stator core 21 so as to configure the flow passage of the coolant.

As illustrated in FIG. 4, the partition 25 is provided in the slot 211 of the stator core 21. The partition 25 is interposed between the adjacent segment coils 221 on the inside of the slot 211. In addition, the partition 25 is interposed between the inner surface of the slot 211 and the segment coil 221 to function as the insulation paper 23 of FIG. 12.

As illustrated in FIG. 5, the partition 25 has an annual portion 255, a plurality of erection portions 254 that are erected from the annual portion 255, and a wall portion 251 that is erected from the annual portion 255 toward the opposite side of the erection portions 254 (the air gap portion 24 side).

That is, the partition 25 of the present example includes the annual portion 255 that forms the annual shape and that is brought into abutment with the teeth 212 formed in the first stator core portion 21A or the second stator core portion 21B, the erection portions 254 that are erected from the annual portion 255 and that are inserted into the slots 211, and the wall portion 251 that is erected from the annual portion 255 toward the air gap portion 24.

The annual portion 255 is configured of a flat plate surface perpendicular to the stacking thickness direction of the stator core 21, and forms the annular shape about the center line 31a (see FIG. 1). The annular portion 255, the erection portions 254, and the wall portion 251 are integrally molded by a resin or the like, thereby serving as the function of the insulation between the segment coils 221 in the slot 211 of the stator core 21 without affecting the magnetic circuit of the stator core 21.

The erection portions 254 configure slot insertion portions that are inserted into the insides of the slots 211. The annular portion 255 is opposed to the end surface (the teeth 212) of the first stator core portion 21A or the second stator core portion 21B so as to be brought into abutment with the end surface (the teeth 212). In this way, the annular portion 255 configures a teeth abutting portion. The wall portion 251 is provided along the inner circumference edge in the inner circumference edge portion of the annular portion 255.

Openings that communicates with inner spaces 252 of the erection portions 254 are provided in the annular portion 255. The inner spaces 252 of the erection portions 254 configure coil insertion portions into which the segment coils 221 are inserted. The coil insertion portions 252 are divided into a plurality of sections by partition walls 253 in the radial direction. Each of the segment coils 221 is inserted into each of the sections divided by the partition walls 253. Each of the sections forms a row in the radial direction, and a plurality of rows are disposed with spacing in the circumference direction. The interval between the coil insertion portions 252 that are adjacent in the circumference direction corresponds to the interval between the slots 211 of the stator core 21.

That is, the erection portions 254 have the coil insertion portions 252 into which the plurality of coil conductors 221 are inserted. The coil insertion portions 252 are divided into a plurality of sections by the partition walls 253 in the radial direction. Each of the coil conductors 221 is inserted into each of the sections divided by the partition walls 253.

As illustrated in FIGS. 3 and 4, a gap S1 is formed between the segment coil 221 inserted into the coil insertion portion 252 and the partition 25. That is, the stator core 21 includes the partition 25 that is inserted into the slot 221 and that performs partition between the plurality of coil conductors 221 and between the coil conductor 221 and the stator core 21. The partition 25 has the gap S1 into which the coolant is made to flow between the partition 25 and the coil conductor 221.

According to the configuration described above, the rotating electric machine 1 of the present example includes: the stator core 21 that has the first stator core portion 21A and the second stator core portion 21B that have the slots 211 and that are divided in the axial direction, and the air gap portion 24 that is formed between the first stator core portion 21A and the second stator core portion 21B by making the first stator core portion 21A and the second stator core portion 21B face each other in the axial direction; the plurality of coil conductors 221 that are inserted into the slots 211; the wall portion 251 that covers the air gap portion 24 on the inner circumference side of the air gap portion 24; and the coolant flow passage S1 that sends the coolant supplied from the outer circumference side of the stator core 21 to the air gap portion 24, through between the plurality of coil conductors 221 to both end surfaces of the stator core 21.

The partition 25 illustrated in FIG. 5 is disposed in each of the first stator core portion 21A and the second stator core portion 21B. When the first stator core portion 21A and the second stator core portion 21B are assembled, the partition 25 provided in the first stator core portion 21A and the partition 25 provided in the second stator core portion 21B are assembled such that the respective wall portions 251 are brought into abutment with each other.

That is, the wall portion that covers the air gap portion 24 is configured such that a wall portion 251A of the partition (a first partition portion) 25 provided in the first stator core portion 21A (see FIG. 2) and a wall portion 251B of the partition (a second partition portion) 25 provided in the second stator core portion 21B (see FIG. 2) are brought into abutment with each other.

As illustrated in FIGS. 1 and 3, the housing 7 has a plurality of openings 71. Each of the openings 71 is provided as a through hole that is penetrated through the outer circumference surface and the inner circumference surface of the housing 7. The opening (the through hole) 71 configures a coolant flow inlet. The opening 71 is provided at the same position as the air gap portion 24 of the stator core 21 in the stacking thickness direction (the axial direction). The coolant that is made to flow from the coolant flow inlet (the opening) 71 into the air gap portion 24 is pressure-sent from the outer circumference side of the stator core 21 toward the inner circumference side of the stator core 21, as indicated by the arrows in FIG. 3.

The wall portion 251 is provided on the inner circumference side (the inside diameter side) of the air gap portion 24 of the stator core 21. The coolant that is pressure-sent from the coolant flow inlet 71 in the outer circumference of the air gap portion 24 is closed in the flow passage by the wall portion 251. The coolant that is closed in the flow passage by the wall portion 251 is made to flow into the slots 211 of the stator core 210. When the flow passages are the same in pressure loss, the coolant is equally made to flow into the slots 211 of both of the divided first stator core portion 21A and second stator core portion 21B.

The partition 25 that sections the segment coils 221 and that sections the segment coil 221 and the stator core 21 is provided in the slot 211 of the stator core 21, and the gap S1 is present between the partition 25 and the segment coil 221, so that the coolant is made to flow in the gap S1 to reach both end surfaces of the stator core 21. Thereafter, the coolant is made to flow out from the both end surfaces of the stator core 21 to the outside of the stator core 21, and is injected to the coil end portions 222 and 223.

In the present example, the wall portion 251 and the partition wall 253 in the slot 211 of the stator core 21 are integrally molded by the resin or the like. Then, the coil insertion portion 252 of the partition 25 is opened with respect to the air gap portion 24, and the gap S1 is formed between the segment coil 221 and the partition 25, so that the coolant can be easily made to flow into the slot 211. Here, as the coolant, the oil is mainly assumed.

The coolant that is made to flow in such the cooling flow passage can directly cool the segment coil (the coil conductor) 221 in which copper loss is caused, in the slot 211 of the stator core 21, and in addition, can also directly cool the stacking thickness direction center portion of the stator core 21 that is likely to have the highest temperature. In addition, the teeth 212 of the stator core 21 in which iron loss is caused can also be cooled at the same time. When the cooling efficiency can be increased by such the cooling method, the design by the higher current density is enabled, and the smaller size and the higher output of the rotating electric machine can be realized.

Figure 6:
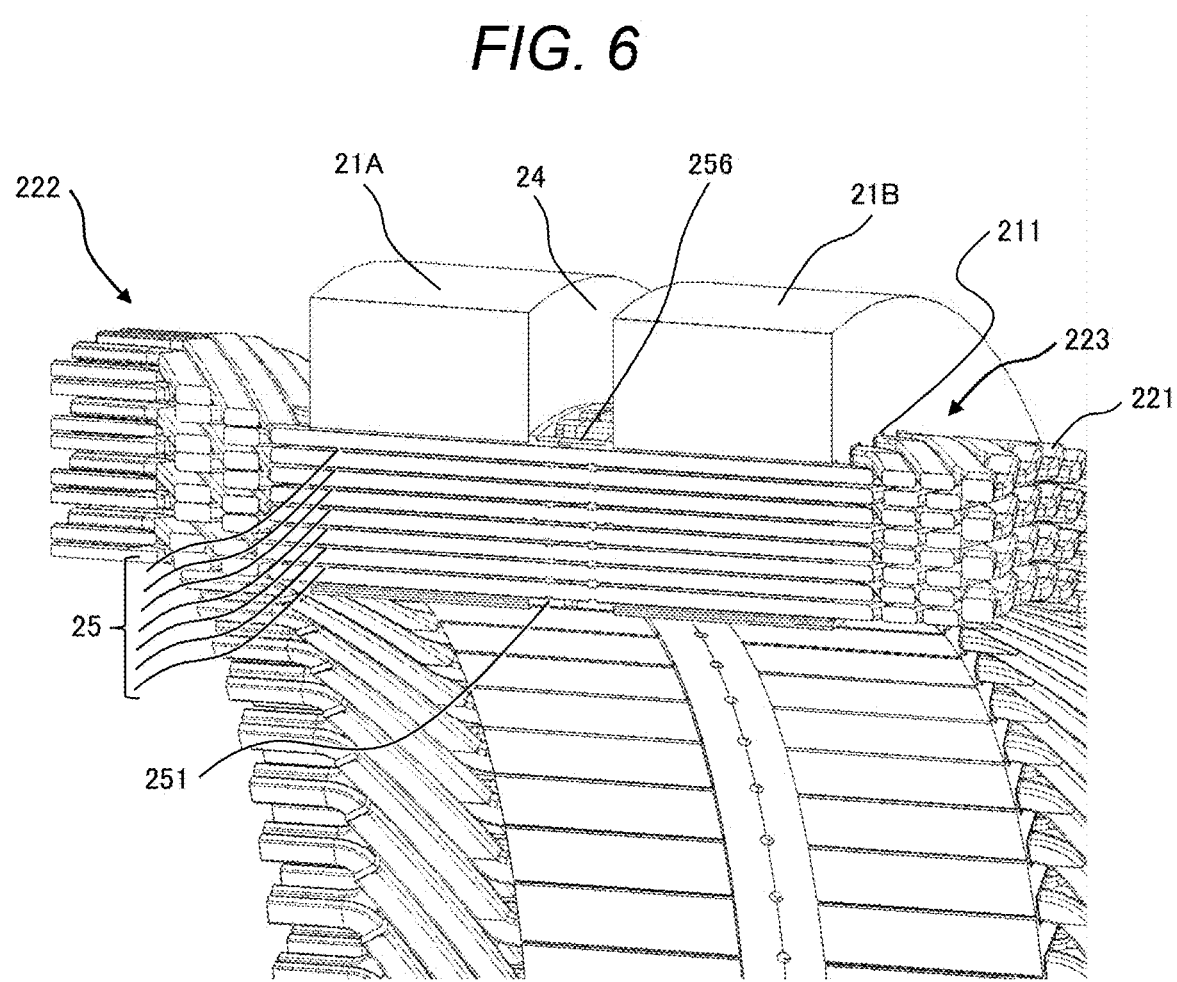
FIG. 6 is an enlarged view of a portion corresponding to the VI portion of FIG. 2 illustrating a modification example of the partition.
Figure 7:
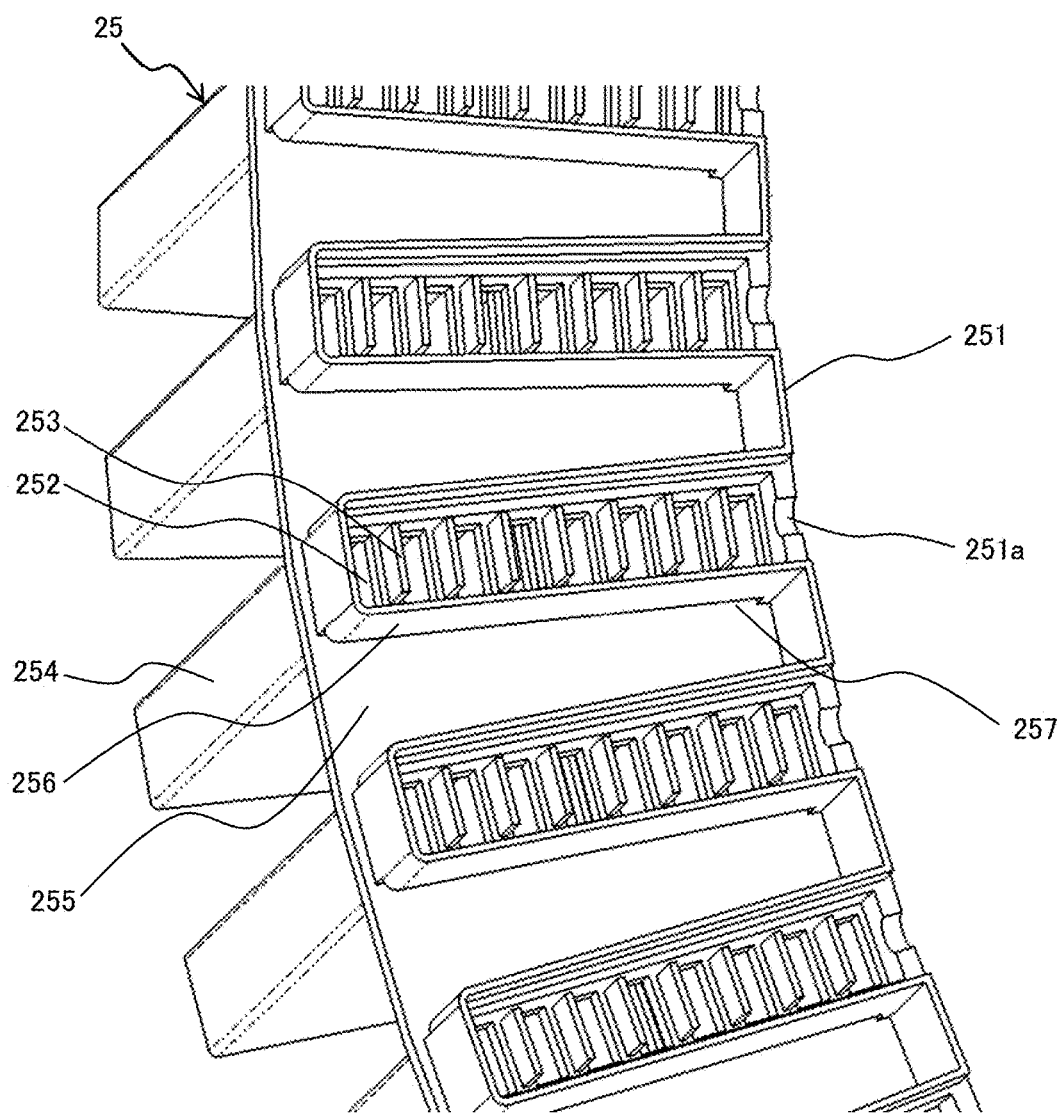
FIG. 7 is a perspective view illustrating the modification example of the partition.

A modification example of the partition 25 will be described with reference to FIGS. 6 and 7. FIG. 6 is an enlarged view of a portion corresponding to the VI portion of FIG. 2 illustrating the modification example of the partition 25. FIG. 7 is a perspective view illustrating the modification example of the partition 25. It should be noted that in FIG. 6, the illustration of the housing 7 is omitted.

In this example, a coil surrounding portion 256 that surrounds the segment coils 221 in the air gap portion 24 is provided in the annual portion 255 of the partition 25. This point is different from the example described above, and other configurations are the same as the example described above. The coil surrounding portion 256 forms a space that surrounds the segment coils 221 in the portion in which the segment coils 221 are penetrated through the air gap portion 24. It should be noted that this space may admit the coolant thereinto and be filled with the coolant.

The coil surrounding portion 256 is integrally molded by the resin or the like together with the wall portion 251, the annular portion 255, and the erection portion 254. The space that surrounds the segment coils 221 by the coil surrounding portion 256 is formed in the portion in which the segment coils 221 are penetrated through the air gap portion 24, and the resin material is filled in this space through an opening 251a of the wall portion 251. The resin material fixes the segment coils 221 to the partition 25.

The partition 25 has a communication path 257 that communicates with the gap S1 (see FIGS. 3 and 4) between the segment coil 221 and the partition 25 in the border (the connection portion) between the annular portion 255 and the coil surrounding portion 256. The communication path 257 configures the coolant inlet into the slot 211 (the gap S1).

That is, the partition 25 has, in the annular portion 255, the coil surrounding portion 256 that surrounds the coil conductors 221 on the inside of the air gap portion 24. Further, the partition 25 has the communication path 257 that communicates with the gap S1 formed between the coil conductor 221 and the partition 25 in the connection portion of the annular portion 255 and the coil surrounding portion 256.

The stator of the rotating electric machine has conventionally performed the integration of the stator core, the coil conductor, and the insulation paper by dropping liquid varnish to these or causing these to be impregnated with the liquid varnish. This integration method inhibits the disassembling properties with respect to the needs for the recycle of the current stator material. Like the present example, the integration method by fixing part of the coil conductor is considered to be useful in ensuring the disassembling properties at the time of the recycle.

A modification example of the stator winding 22 will be described with reference to FIGS. 8 to 10.

Figure 8:
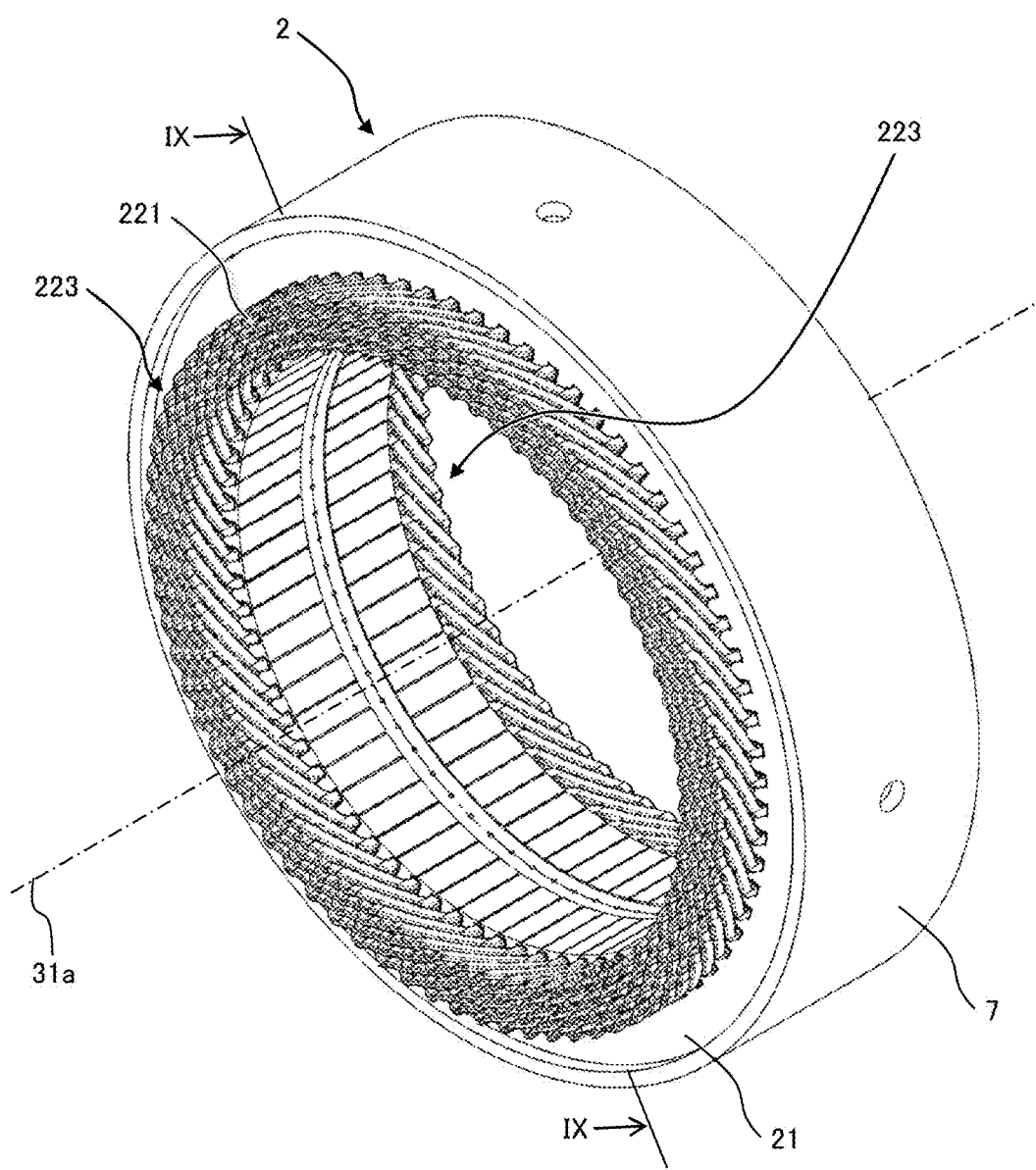
FIG. 8 is a perspective view of the stator according to a modification example of a stator winding.

FIG. 8 is a perspective view of the stator 2 in accordance with the modification example of the stator winding 22. FIG. 9 is a perspective view illustrating a cross portion taken along line IX-IX of the stator 2 of FIG. 8.

In this example, in the stator of FIG. 1, the coil conductors formed in U-shape are inserted from the respective end portions in the opposite directions of the divided first stator core portion 21A and second stator core portion 21B, and are electrically connected in the air gap portion 24.

That is, the coil conductor 221 is configured of a first coil conductor 221A (see FIG. 10) and a second coil conductor 221B (see FIG. 10) that are inserted from the end surface sides in the opposite directions with respect to the respective first stator core portion 21A and second stator core portion 21B. The first coil conductor 221A and the second coil conductor 221B are electrically connected in the air gap portion 24.

In this example, the electric connection portion of the segment coils 221 formed in U-shape is disposed in the air gap portion 24, so that the jig for welding or the like can be inserted from the outer circumference side of the air gap portion 24 into the air gap portion 24, thereby enabling the configuration of this example.

The stator using the segment coils has conventionally formed the electric circuit by inserting the coils formed in U-shape into the slots from the stator core end portion on one side, twisting the segment coils in the circumferential direction at the end portion on the opposite side, and electrically joining the ends thereof by welding or the like. In this case, the segment coil holding allowance for the twisting in the circumference direction and the welding clamp allowance for the electric joining are required, and for that, the overall length of the stator is increased, and the coil conductor usage amount is also increased. The method by which the segment coils 221 formed in U-shape are inserted from the respective end portions of the divided first stator core portion 21A and second stator core portion 21B does not require the coil holding allowance for twisting the segment coils 221 and the welding clamp allowance. As a result, the overall length of the stator 2 is shortened, so that there is an effect of reducing the coil conductor usage amount.

Figure 9:
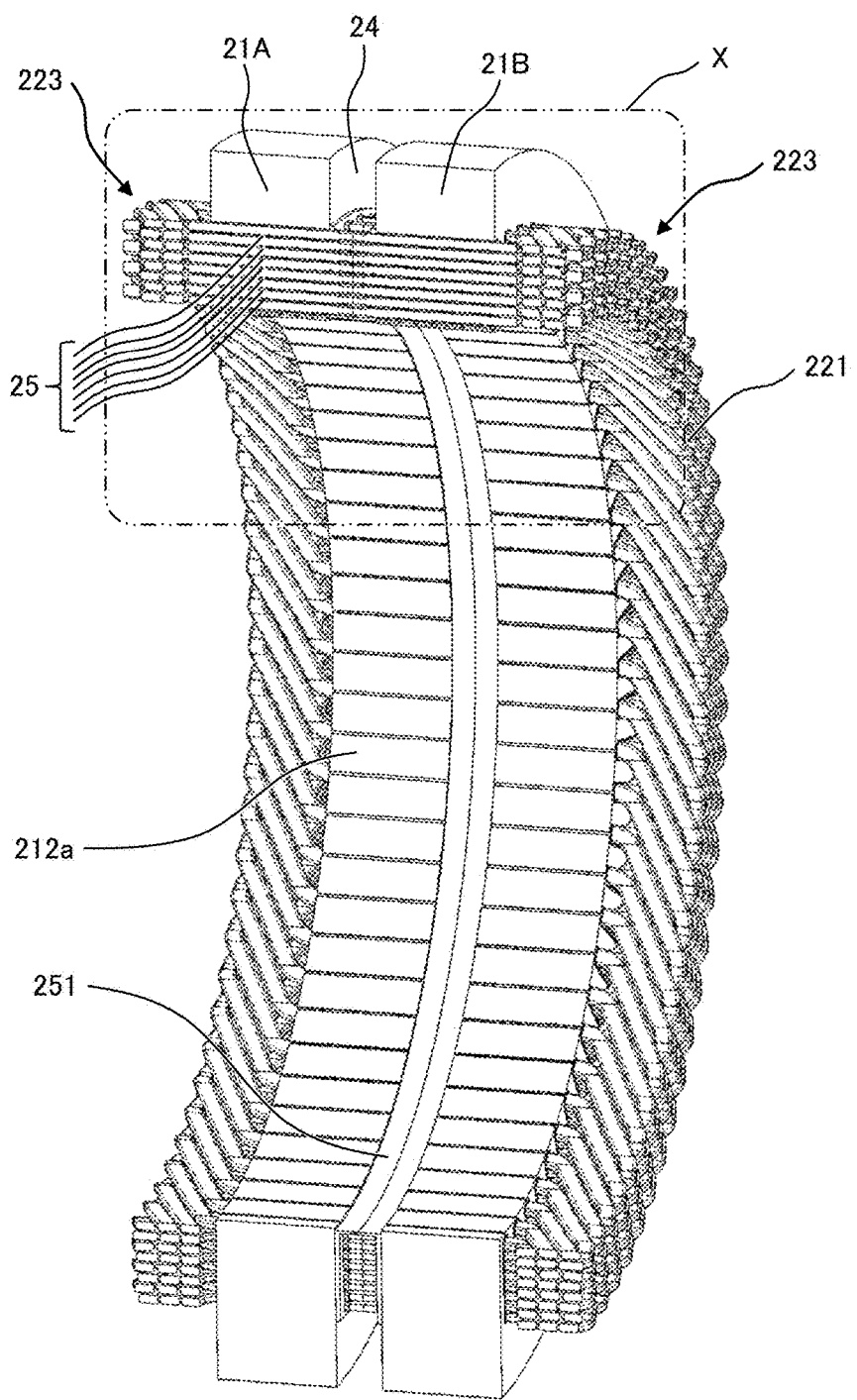
FIG. 9 is a perspective view illustrating a cross portion taken along line IX-IX of the stator of FIG. 8.
Figure 10:
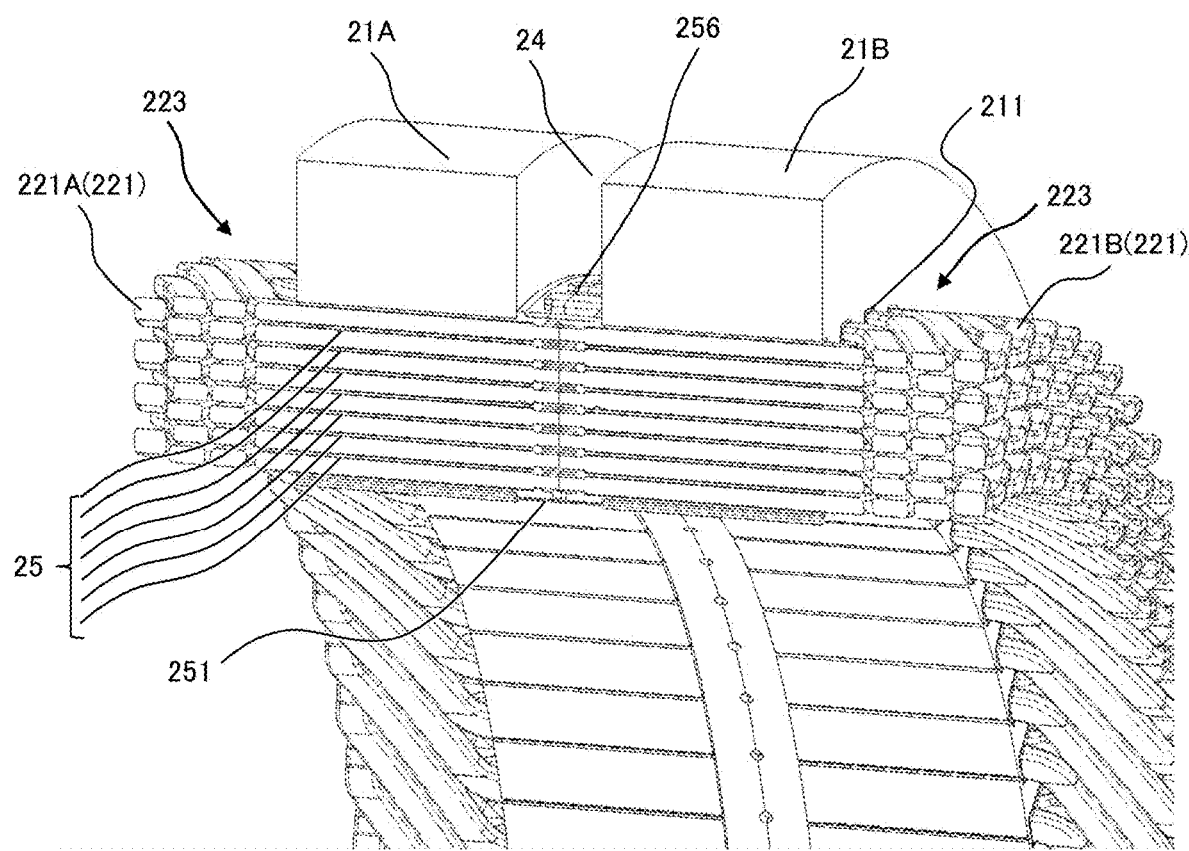
FIG. 10 is an enlarged view of the X portion of FIG. 9.

FIG. 10 is an enlarged view of the X portion of FIG. 9.

As illustrated in FIG. 10, the partition 25 of FIG. 7 should be combined with the configuration of FIGS. 8 and 9. When two segment coils 221 are connected in the air gap portion 24, the portion in which the film of enamel or the like is separated is left in the connection portion. The resin material is filled in the space in which the coil surrounding portion 256 surrounds the segment coils 221, so that in addition to the effect described above, the electric insulation for the film separation portion can be performed by the resin material.

In the example described above, the example in which the stator core 21 is divided into two has been described, but the stator core 21 may be divided into three or more.

It should be noted that the present invention is not limited to the examples described above, and includes various modification examples. For example, the examples described above have been described in detail to simply describe the present invention, and are not necessarily required to include all the described configurations. In addition, part of the configuration of each of the examples can be subjected to addition, deletion, and replacement with respect to other configurations.

REFERENCE SIGNS LIST

21: stator core
21A: first stator core portion
21B: second stator core portion
24: air gap portion
25: partition
211: slot
212: teeth
221: coil conductor (segment coil)
221A: first coil conductor
221B: second coil conductor
251: wall portion
251A: wall portion of first partition portion 25
251B: wall portion of second partition portion 25
252: coil insertion portion
253: partition wall
254: erection portion
255: annular portion
256: coil surrounding portion
257: communication path
S1: gap between partition 25 and coil conductor 221 into which coolant is made to flow (coolant flow passage)

What is claimed is:

1. A rotating electric machine comprising:
a stator core that has a first stator core portion and a second stator core portion, and an air gap portion,
the first stator core portion and the second stator core portion having slots and being divided in the axial direction, the air gap portion being formed between the first stator core portion and the second stator core portion by making the first stator core portion and the second stator core portion face each other in the axial direction;
a plurality of coil conductors that are inserted into the slots;
a wall portion that covers the air gap portion on the inner circumference side of the air gap portion; and
a coolant flow passage that sends a coolant supplied from the outer circumference side of the stator core to the air gap portion, through between the plurality of coil conductors to both end surfaces of the stator core, wherein
a partition that is inserted into the slot and that performs partition between the plurality of coil conductors and between the coil conductor and the stator core is provided,
the partition has a gap into which the coolant is made to flow between the partition and the coil conductor, and
the partition includes:
an annular portion that forms an annular shape and that is brought into abutment with teeth formed in the first stator core portion or the second stator core portion;
erection portions that are erected from the annular portion and that are inserted into the slots; and
the wall portion that is erected from the annular portion toward the air gap portion.

2. The rotating electric machine according to claim 1,
wherein the erection portions have coil insertion portions into which the plurality of coil conductors are inserted,
wherein the coil insertion portions are divided into a plurality of sections by partition walls in the radial direction, and
wherein each of the coil conductors is inserted into each of the sections divided by the partition walls.

3. The rotating electric machine according to claim 2,
wherein the partition is provided in each of the first stator core portion and the second stator core portion, and
wherein the wall portion is configured such that the wall portion of the partition provided in the first stator core portion and the wall portion of the partition provided in the second stator core portion are brought into abutment with each other.

4. The rotating electric machine according to claim 1,
wherein the partition has, in the annular portion, a coil surrounding portion that surrounds the coil conductors on the inside of the air gap portion, and has, in the connection portion of the annular portion and the coil surrounding portion, a communication path that communicates with the gap formed between the coil conductor and the partition.

5. The rotating electric machine according to claim 1,
wherein the coil conductor is configured of a first coil conductor and a second coil conductor that are inserted from the end surface sides in the opposite directions with respect to the respective first stator core portion and second stator core portion, and
wherein the first coil conductor and the second coil conductor are electrically connected in the air gap portion.

* * * * *